F. L. DAMBACHER.
MOTOR CYCLE STAND.
APPLICATION FILED SEPT. 27, 1917.
1,278,113.
Patented Sept. 10, 1918.
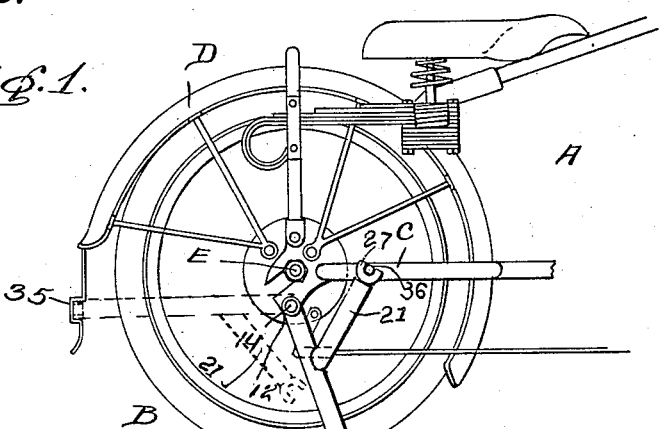
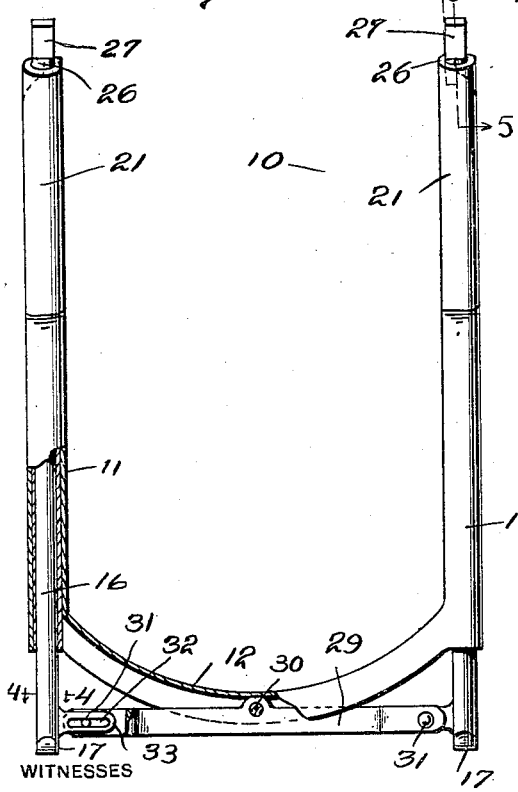
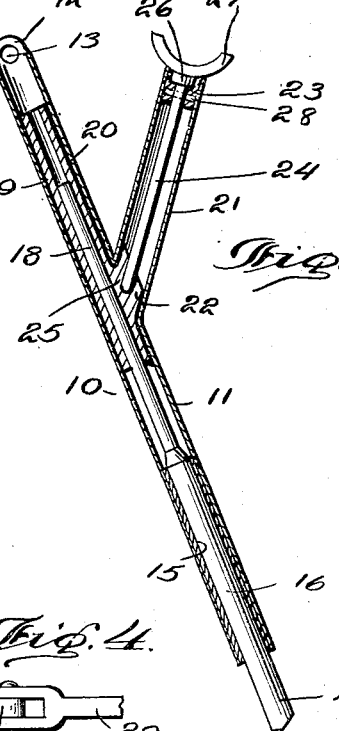
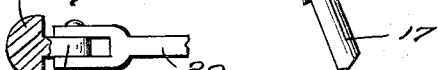
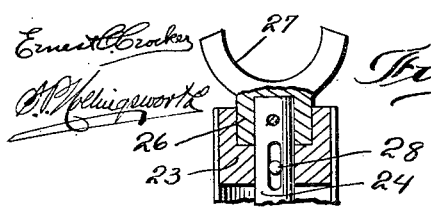
WITNESSES
INVENTOR
Fred L. Dambacher
BY
ATTORNEY

UNITED STATES PATENT OFFICE.

FRED L. DAMBACHER, OF COTTONWOOD, CALIFORNIA.

MOTOR-CYCLE STAND.

1,278,113.  Specification of Letters Patent.  Patented Sept. 10, 1918.

Application filed September 27, 1917. Serial No. 193,571.

*To all whom it may concern:*

Be it known that I, FRED L. DAMBACHER, a citizen of the United States, residing at Cottonwood, in the county of Shasta and State of California, have invented certain new and useful Improvements in Motor-Cycle Stands, of which the following is a specification.

This invention relates to a vehicle supporting stand, and particularly to a stand for motor cycles; the invention having for its primary object to provide a strong, light, firmly supported, and easily operated stand for maintaining a motor cycle in upright position with the rear wheel above the ground, the motor cycle at all times maintaining a vertical position whatever the gradient of the road or ground upon which it is standing, transversely of the vehicle.

A further object of the invention is to provide a stand for a motor cycle having longitudinally adjustable feet and legs connected together in such a manner as to move in opposite directions for the purpose of leveling or holding in upright position and a true vertical plane, the vehicle to which it is attached, irrespective of the irregularity or inclination of the ground on which it is standing.

With the above objects in view the invention consists in the novel construction, combination, and arrangement of parts hereinafter described, pointed out in the appended claims and illustrated in the accompanying drawings, in which Figure 1 is an elevation of the right side of a motor cycle frame with the improved supporting stand applied thereto and in position for use.

Fig. 2 is a rear elevation of the motor cycle stand with portions shown in section.

Fig. 3 is a vertical longitudinal section through one of the legs of the stand.

Fig. 4 is a detailed cross sectional view on the line 4—4 of the Fig. 2.

Fig. 5 is an enlarged detailed sectional view on the line 5—5 of Fig. 2.

In the drawings, A indicates the motor cycle of which B is the rear wheel, C the frame in which the rear wheel is mounted and D the mud guard or fender extending over the top of the wheel B and attached to the frame C, all as usual in vehicles of this type.

For the purpose of holding the motor cycle in upright position there is provided at the rear thereof a stand 10 comprising two upright tubular members 11 rigidly connected at their lower ends by a downwardly curved brace 12 preferably made of channel metal as shown. The tubular members 11 which form the legs of the stand are placed one on each side of the rear wheel and project slightly below or beyond the periphery of the wheel. The upper end of each leg 11 is formed with a pair of ears 12$^a$ having openings 13 therein for the passage of a bolt 14 by which the legs are pivoted to the frame of the motor cycle adjacent the rear wheel axle E.

Within each of these legs 11 at its lower end is a bushing 15 or thickening of the walls to provide guiding means for a rod 16, the lower end of which rod projects beyond the leg 11 to form the foot 17 for the stand. The rod 16 about midway its length is of reduced size and extends nearly to the upper end of the leg 11, the upper end 18 passing between two long friction blocks 19 and 20, the former being brazed or otherwise secured to the tubular member 11, while the latter block is mounted freely in said member and adapted to move to and from the end 18 of the rod 16.

Projecting from each tubular member or leg 11 on the forward side thereof and a short distance below the upper end is a branch 21 that extends upwardly at an angle and communicates with the leg at its junction therewith. The movable block 20 within the leg 11 has a short angular stud 22 formed on its forward side to enter the branch 21 and serves as a guide for the block in its movement to and from the rod end 18, and also to prevent longitudinal movement of the block. The upper end of the branch 21 is fitted with a bushing 23 having a central opening therein through which a rod 24 passes and engages an opening or seat 25 in the lug 22. The outer end of the opening in bushing 23 is enlarged to receive the hub 26 on the lower end of a fork 27, said hub being secured to the upper end of the rod 24. A longitudinal slot is formed in the rod 24 just below the hub 26 through which a pin 28 passes to permit limited longitudinal movement to the rod but prevents withdrawal of the same.

The feet 17 of the motor cycle stand are connected together at their lower ends by a rocking lever 29 pivoted at 30 within the channel brace 12 midway its length and also pivoted at its end by pins 31 passing through said ends and through horizontal slots 32 in the lugs 33 extending toward each other from the two legs.

In using this stand the ears 12a are pivoted to frame C on opposite sides of the rear wheel B near the axle E and when not in use the stand is swung upward into substantially horizontal position and supported in such position by a spring catch 35 depending from the rear of the fender D. When the stand is to be used, it is disengaged from the catch 35, and permitted to swing downwardly on the pivots 14 until the feet 17 rest on the ground. If the motor cycle be now moved rearwardly the feet 27 of the stand will engage the ground and form pivot for the stand to swing rearwardly, the upper end of the stand and the motor cycle on which it is hinged passing, by this movement back of a vertical line through the feet 17, as shown in Fig. 1, until the forks 27 engage the underside of the lateral projecting studs 36 rigid with the vehicle frame C. A portion of the weight of the vehicle is thus transferred to the forks 27 and transmitted through the rods 24 to the loose blocks 20, the latter pressing against the smaller ends of the rods 16, hold said rods against endwise movement. Owing to the sliding engagement of the enlarged portions of the rods 16 with the bushings 15 and their connection together by the pivoted lever 29, should the ground prove to be irregular or inclined to one side transversely of the rear wheel, the feet will be moved into or out of the legs 11 coöperatively to rest both upon the ground with great firmness while maintaining the legs of the stand and the vehicle in vertical position. This adjustment it is to be understood, will occur before the weight of the vehicle is placed upon the forks 27 which, as previously stated, holds the feet in their adjusted position by means of the gripping action of the loose blocks 20. The forward movement of the motor cycle will, as is common with motor cycle stands of the present day, place the machine upon both wheels and free of the stand which can then be swung upwardly and rearwardly and secured by the clip 35.

I claim:

1. A stand for two wheeled vehicles of the bicycle type comprising a tubular leg pivotally mounted on each side of the vehicle frame adjacent the axle of one of the wheels, a connection between the lower ends of said legs, a rod slidable in each leg, their lower ends forming feet for the stand and pivotally connected together by a bar also pivoted to the connection between the legs, coöperating friction blocks within the legs adapted to embrace said rods and prevent longitudinal movement thereof, and means adapted to sustain a portion of the weight of the vehicle when raised from the ground to actuate and press said friction blocks against the rods.

2. A stand for vehicles of the bicycle type comprising a tubular leg pivotally connected on opposite sides of the rear wheel to the vehicle frame, a rod slidable longitudinally in each leg the lower end of which rods form feet, a cross brace between the lower ends of said legs, a cross bar connecting by sliding pivots with the lower ends of the leg rods and also pivoted between its ends to said cross brace, a branch projecting angularly upward from the front of each of said tubular legs, a movable pressure block within the upper end of each leg adapted to bear upon the upper end of the rod therein and prevent it from moving longitudinally, said blocks each having a lug projecting into the branch to prevent longitudinal movement, and a rod having a yoke on its upper end above the branch and engaging at its lower end with the lug on the block to press said block against the sliding rod when the weight of the vehicle is transferred to said yoke.

3. A stand for motor cycles comprising a tubular member pivotally connected on each side of the rear wheel to the frame near the axle of said wheel, a cross brace between the lower ends of said tubular members or legs, a tubular branch extending upwardly at an angle from the side of each of said tubular members, a rod slidable longitudinally through each of said members and extending upwardly nearly to the upper end, the lower ends of said rods forming feet, a lever pivoted intermediate its ends to the cross brace between the legs and having slidable pivoted connection at its ends with the two foot rods, a fixed block within the upper end of each of said legs, a coöperating movable block to clamp therebetween the upper end of said sliding rod, a push rod in each of said branches bearing at its lower end against the movable block and having a yoke at its upper end projecting from the branch adapted to support a portion of the weight of the motor cycle and transmit said weight through the rod in the branch to the clamping block.

4. A stand for motor cycles comprising a pair of tubular members rigidly connected together at their lower ends and having pivoted ears at their upper ends for attachment to the frame of the motor cycle, each of said tubular members forming a leg for the stand and having an upwardly projecting angular branch on the front thereof, a longitudinally slidable tubular rod in each of said legs, their lower ends forming feet for the stand, a guide bushing in the lower end of each leg for said rod, a pair of guides in the upper end of the leg between which the rod is adapted to slide, one of said guides being fixed and the other movable and having a lug on one side to enter said branch and hold the block against longitudinal play, a rod extending longitudinally of each branch and engaging said lug at its lower end, a yoke on the upper end of the rod projecting above the branch to engage when in operative position the motor cycle frame and receive a portion of the weight which being transmitted to said rod and then to the movable block serves to clamp the sliding rod against longitudinal movement.

In testimony whereof I affix my signature in presence of two witnesses.

FRED L. DAMBACHER.

Witnesses:
W. L. ROSE,
F. A. STOCKEL.

Copies of this patent may be obtained for five cents each, by addressing the "Commissioner of Patents, Washington, D. C."